Jan. 20, 1931.  S. D. TÖNNESSEN ET AL  1,789,791
CASTING OF CONCRETE WALLS FOR BUILDINGS, DAMS,
AND OTHER ARTICLES MADE OF CONCRETE
Original Filed Nov. 21, 1928
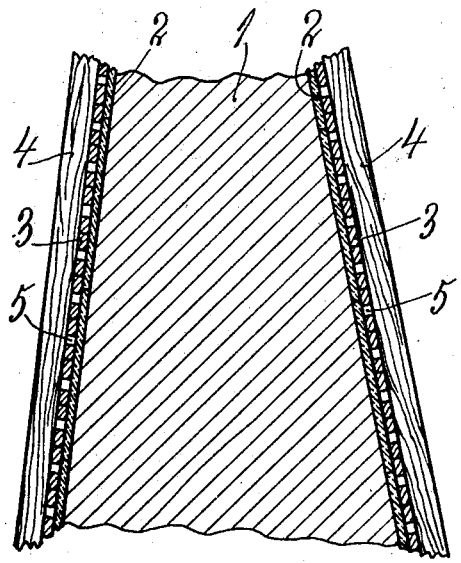
Inventors:
Stefan Due Tönnessen
and Alfred Theodor Knudsen
By
Attorney.

UNITED STATES PATENT OFFICE

STEFAN DUE TÖNNESSEN AND ALFRED THEODOR KNUDSEN, OF KRISTIANSSAND, NORWAY

CASTING OF CONCRETE WALLS FOR BUILDINGS, DAMS, AND OTHER ARTICLES MADE OF CONCRETE

Application filed November 21, 1928, Serial No. 320,912, and in Norway December 12, 1927. Renewed August 4, 1930.

This invention relates to improvements in the casting of concrete walls for buildings, dams and other articles made of concrete, and has for its object to provide said buildings, dams and the like with a perfectly smooth outer surface or surfaces, said smooth surface or surfaces having a structure of such density as to be practically weatherproof and waterproof.

This object is obtained by applying an improved method of moulding and casting to be described in the following.

This method is peculiar therein that there are used moulds, having their inner surfaces lined with glass plates, and that these moulds are left standing for a much longer period than is usual in the casting industry, i. e. not only until the wall or dam to be cast has been hardened sufficiently to make the removal of the mould with its accompanying scaffolding possible without damaging the outer surfaces of the wall or dam, but until the hardening and contracting process of the outer layers of the cast wall or dam has advanced so far as to make the surfaces let go their hold on the glass surfaces, against which they are cast, thus protracting the process of hardening and contracting subsequent to the expansion caused in the chemical binding process very considerably.

Hitherto it is usual to remove the moulds after a few days, but it has been proved by a series of experiments that, if a glass surface is placed next to the casting, whereby the evaporation of the moisture in the mass adjacent to the mould is prevented, and the moulds are then removed after the usual period of some few days, then will be obtained smooth surfaces; but the surfaces will not be waterproof or weatherproof to any marked extent. If, however, the casting process is extended over a much longer period, as two to four weeks or more,—(the length of this period being dependent of a number of facts, such as the quality of the cement used, the proportion of cement, sand, gravel and water in the casting, the temperature and degree of moisture of the air),—so as to give the cast wall or dam time to harden and contract, the layers of the casting adjacent to the glass surfaces hardening very slowly on account of the exclusion of air by the glass plates, this slow hardening and contracting process will in combination with the polishing influence of the glass plates give as a result a wall or dam, having surfaces that besides being as smooth as if they were polished, are also highly waterproof and weatherproof. Thus this invention is based on the contraction of the cement effecting a drawing back of its surface from the glass mould. As before mentioned, this result is not obtained if the moulds are removed at an earlier stage of the process.

As has been proved by experiments, the progress of the hardening and contracting process may be controlled by observing the surface of the cast wall through the glass plates, the progress of the complete hardening of the surface being made visible thereby that the edges of the parts of the surface that are not yet completely hardened and drawn back from the glass, are marked by iridescent lines or zones. Only when all of these iridescent lines or zones have disappeared, the hardening and polishing process of the surface is completed, and the moulds may be removed.

The method is peculiarly adapted for dams, walls and other structures, in which it is important to have surfaces of a maximum density, so as to make them waterproof and weatherproof. The invention is not restricted to any special sort or quality of cement or concrete. It may be used for constructions reinforced or not, and may be used for both sides of a wall or only for one side of the same. Thus for dams we may use glass moulds on both sides, while for the walls of other buildings it may be sufficient to use such moulds only for one side of the walls.

Usually it will be necessary to provide the glass plates forming the contact surfaces of the mould with a backing, adapted to take up part of the strains to which the glass plates are subjected during the filling, stamping and expansion of the concrete. Such backing will then have to be provided with a number of peepholes in order to make it possible to control the hardening process through the medium of the iridescent zones mentioned above.

The accompanying drawing illustrates a part of a mould in accordance with the invention, in sectional view. 1 is a part of the cast concrete body of a dam or the like. 2 are glass plates, fastened side by side on the inside of backing boards 3, which are fastened in the usual way to posts or standards 4. The boards 3 are with suitable intervals provided with peep holes 5, through which the progress of the hardening process may be controlled.

We do not claim casting against glass plates per se, as our invention, as it is well known to cast artificial stones and the like on a glass plate.

Claims:—

1. Method of casting concrete dams, walls for buildings and other articles made of concrete, consisting in casting said dams, walls and the like against moulds of glass plates and leaving said moulds in place, until the hardening process of the concrete has progressed so far as to draw the contacting surfaces of the same completely back from said glass moulds.

2. Method of casting concrete dams, walls for buildings and the like, consisting in casting said dams, walls and the like against moulds, lined with glass plates on the inside, and leaving said moulds in place until the hardening process of the concrete has progressed so far as to draw the contacting surfaces of the same back from said glass lining.

3. Method of casting concrete dams, walls for buildings and the like, consisting in casting said dams, walls and the like against moulds of glass plates, and leaving said moulds in place until the hardening and contracting process of the concrete has progressed so far that iridescent zones visible between the glass plates and the surface of the concrete have disappeared.

4. Mould for casting concrete dams, walls for buildings and the like, comprising an inner lining of glass plates, a backing supporting said lining, and peep holes in said backing for controlling the hardening process and the time for removing the mould.

In testimony whereof we have signed our names unto this specification.

STEFAN DUE TÖNNESSEN.
ALFRED THEODOR KNUDSEN.